United States Patent Office 2,851,489
Patented Sept. 9, 1958

2,851,489

AMINOHYDROXYIMINO ALIPHATIC CARBOXYLIC ACIDS AND THE PREPARATION THEREOF

Henry C. Godt, Jr., St. Louis, John F. Quinn, Kirkwood, and Harold Raffelson, St. Louis, Mo., assignors to Monsanto Chemical Company, St. Louis, Mo., a corporation of Delaware No Drawing. Application April 20, 1955
Serial No. 502,730

5 Claims. (Cl. 260—534)

This invention relates to new compositions of matter and more specifically to a monoamidoxime of a dicarboxylic acid, an amino-hydroxyimino aliphatic carboxylic acid, and a method for their preparation.

It has now been discovered that amidoximes, amino-hydroxyimino aliphatic carboxylic acids, having the formula, $$HOOC-A-\underset{\|}{\overset{NOH}{C}}-NH_2$$

wherein A is a divalent open-chain aliphatic group and preferably a divalent open-chain saturated hydrocarbon group containing from 2 to 10 carbon atoms can be readily and conveniently prepared by the reduction of the corresponding nitro-hydroxyimino aliphatic carboxylic acid (nitrolic acid) with hydrogen under mild hydrogenation conditions. Preferably the reduction is carried out in the presence of a hydrogenation catalyst such as platinum, nickel, palladium and the like. It is also preferred that a reaction diluent or solvent be employed. The most preferred solvent diluent is glacial acetic acid. Also, since high yields of the amidoxime can be obtained at about room temperature, reaction temperatures in excess of about 40° C. need not be employed for satisfactory results can be obtained between 20° C. and 40° C.

The mononitrolic acid reactant is obtained from the low temperature oxidation of a cyclic alcohol, a cyclic organic compound containing a carbinol group in a non-aromatic ring. The preferred mononitrolic acids are obtained from cyclobutanol, cyclopentanol, cyclohexanol, cycloheptanol, cyclooctanol and their hydrocarbon substituted homologs such as 3-methyl cyclohexanol, 3,5-dimethylcyclohexanol and the like according to copending application Serial No. 502,731, filed April 20, 1955.

Adipomononitrolic acid can be prepared by a low temperature nitric acid oxidation of cyclohexanol at a temperature below about 35° C. and preferably at a temperature of about 20° C. More specifically, cyclohexanol is slowly added to nitric acid, cooled to about 20° C. with stirring. The resulting reaction medium is maintained at 20° C. throughout the addition of cyclohexanol. After all the cyclohexanol is added the reaction mixture is maintained at 20° C. with stirring until the precipitation of a yellow solid ceases. The yellow solid is then recovered by filtration and air dried. By this process adipomononitrolic acid having a melting point of 77–78° C. with decomposition can be obtained. This process is described in more detail in the co-pending application Serial No. 502,731, filed April 20, 1955.

The following is a detailed description of the preparation of 6-amino-6-hydroxyimino hexanoic acid, adipomonoamidoxime, having the formula, $$HOOC-(CH_2)_4-\underset{\|}{\overset{NOH}{C}}-NH_2$$

In a suitable reaction vessel there is dissolved 8.6 parts by weight (0.045 mole) of adipomononitrolic (6-nitro-6-hydroxyimino hexanoic) acid in 70 parts by weight of glacial acetic acid. Then after adding as a catalyst about 2.4 parts by weight of 5% platinum on charcoal, hydrogen is passed into the glacial acetic acid solution at 25° C. for about 60 minutes at atmosphere until about 0.115 mole of hydrogen is absorbed. Thereafter the resulting solution is filtered to remove the catalyst and the filtrate charged to distillation equipment where glacial acetic acid is recovered. The residual thick orange syrup is triturated with acetone whereupon solidification occurs. The recovered dried solid material comprises 6.0 parts by weight of a white solid representing a yield of 83% based on the adipomononitrolic acid charged. This product melts with decomposition at 156–158° C.

Other mononitrolic acids such as glutaromononitrolic acid and pimelomononitrolic acid employed in the process of this invention will yield glutaromonoamidoxime and pimelomonoamidoxime respectively.

The amidoxime of this invention can be employed as intermediates in the synthesis of other organic compounds in substantially the manner as other amidoximes are employed. Adipomonoamidoxime, glutaromonoamidoxime, pimelomonoamidoxime can be employed as intermediates in the preparation of adipamic acid, glutaramic and pimelamic acids respectively by reacting the amidoximes with nitrous acid or its equivalent as more completely described in copending application, Serial No. 502,734, filed April 20, 1955.

It is understood that the above description is given by way of illustration only and not of limitation, for other embodiments of the process and products within the spirit of this invention will be obvious to those skilled in the art.

What is claimed is:

1. An amidoxime having the formula, $$HOOC-A-\underset{\|}{\overset{NOH}{C}}-NH_2$$

wherein A is a divalent open-chain saturated aliphatic hydrocarbon group containing from 2 to 10 carbon atoms.

2. 6-amino-6-hydroxyimino hexanoic acid having the formula, $$HOOC-(CH_2)_4-\underset{\|}{\overset{NOH}{C}}-NH_2$$

3. The process for preparing an amidoxime having the formula, $$HOOC-A-\underset{\|}{\overset{NOH}{C}}-NH_2$$

wherein A is a divalent open-chain saturated aliphatic hydrocarbon group containing from 2 to 10 carbon atoms, which comprises reducing the corresponding nitrolic acid with hydrogen.

4. The process for preparing 6-amino-6-hydroxyimino hexanoic acid comprising the reduction of 6-nitro-6-hydroxyimino hexanoic acid with hydrogen.

5. The process for preparing 6-amino-6-hydroxyimino hexanoic acid comprising the reduction of 6-nitro-6-hydroxyimino hexanoic acid with hydrogen in the presence of a hydrogenation catalyst selected from the group consisting of platinum, nickel and palladium.

References Cited in the file of this patent

UNITED STATES PATENTS 2,423,180    Doumani et al. _____ July 1, 1947

OTHER REFERENCES

Meyer: Ber. Deut. Chem., vol. 7, page 434 (1874).
Taylor et al.: Sidgwick's Organic Chemistry of Nitrogen (1942), page 201.